United States Patent

[11] 3,623,028

[72] Inventors Muneo Yoshida; Noriyuki Yamauchi; Yosito Kiyama, all of Kobe-shi, Japan

[21] Appl. No. 840,269
[22] Filed July 9, 1969
[45] Patented Nov. 23, 1971
[73] Assignee Mitsubishi Jukogyo Kabushiki Kaisha Tokyo, Japan

[54] INFORMATION READ-OUT SYSTEM

9 Claims, 5 Drawing Figs.

[52] U.S. Cl. .......... 340/173LM, 235/61.11 E, 340/174.1 B
[51] Int. Cl. .......... G11c 13/04
[50] Field of Search .......... 340/173, 174.1, 347; 350/161

[56] References Cited

UNITED STATES PATENTS

| | | | |
|---|---|---|---|
| 2,843,841 | 7/1958 | King et al. | 340/173 |
| 3,020,534 | 2/1962 | Jones | 340/347 |
| 3,387,140 | 6/1968 | Roth et al. | 340/173 |

*Primary Examiner*—Terrell W. Fears
*Attorney*—McGlew and Toren

ABSTRACT: An information carrier includes a base carrying information indicia having physical properties differing from those of the base. The indicia are arranged on the base in a manner such that, during a read-out operation, each indicia is detected twice by a detector. The carrier may comprise a circular transparent base having annular indicia thereon, the indicia being either transparent or nontransparent. A slicing circuit and a shaping circuit connected to the detector provide first pulses specific to only those detected indicia of a particular type, such as the transparent indicia. An amplitude limiter and a shaping circuit connected to the detector provide clock pulses corresponding to each of the detected information indicia. The first pulses are supplied as inputs to AND circuits each respective to a particular indicia. The clock pulses are supplied to cascaded binary circuits whose number is equal to one less than the number of information indicia. A matrix is connected to the outputs of all of the binary circuits, and has respective outputs each connected to a different one of the AND circuits. The outputs of the AND circuits are connected to respective flip-flop circuits each corresponding to a respective information indicia and arranged as a binary circuit. Each AND circuit, responsive to concurrent receipt of a first pulse and a clock pulse, provides a control output signal to a respective flip-flop circuit. Each flip-flop circuit, responsive to receipt, during each output pulse train, of two control output pulses at its input, provides a shift signal at its output. If any flip-flop circuit receives only one control output pulse during each output pulse train, an OR circuit is triggered to sound an alarm.

INVENTOR
MUNEO YOSHIDA
NORIYUKI YAMAUCHI
YOSHITO KIYAMA
BY McGlew & Toren
ATTORNEYS

INFORMATION READ-OUT SYSTEM

SUMMARY OF THE INVENTION

This invention relates to information readout apparatus and, more particularly, to an improved readout apparatus operable with information carriers in which information indicia is detected twice during a readout operation.

In accordance with the invention, a specific property of information indicia on an information carrier is detected twice during each readout operation, by a suitable detector. A first means derives an output pulse for each detected information indicia which has a specific physical property and a second means derives a clock pulse for each detector output. The output from the first means is supplied to an AND circuit corresponding to the respective information indicia and the output of the second means is also supplied to the AND circuit, but by way of a matrix circuit corresponding to the respective information indicia. The outputs of the AND circuits are supplied twice, during each readout operation. In the event that only one output from the AND is supplied to an element of the binary circuit during a readout operation an OR circuit is triggered to sound an alarm.

An object of the invention is to provide an improved information readout system.

Another object of the invention is to provide such an information readout system including an information carrier comprising a base and information indicia carried by the base and having physical properties differing from those of the base, with the indicia being arranged on the base in a manner such that, during a readout operation, each indicia is detected twice by a detector.

A further object of the invention is to provide such an information readout system including first means operable, during each readout operation, to provide an output train including first output pulses corresponding to only those detected information indicia having a specific physical property.

Another object of the invention is to provide an information readout system including second pulse generating means operable, during each readout operation, to provide an output pulse train comprising clock pulses corresponding to each of the detected indicia.

A further object of the invention is to provide an information readout system including pulse responsive means connected to the outputs of both the first and second means and operable, responsive to concurrence of a first pulse and a clock pulse to provide a control output signal.

Another object of the invention is to provide an information readout system including shift signal means connected to the pulse responsive means and operable, responsive to receipt, during each readout operation, of two control output pulses to provide a shift signal at its output.

A further object of the invention is to provide an information readout system in which, when the shift signal means receives a single control output pulse during a readout operation, an alarm is triggered.

For an understanding of the principles of the invention, reference is made to the following description of a typical embodiment thereof as illustrated in the accompanying drawing.

DESCRIPTION OF THE PREFERRED EMBODIMENT

Figure 1:
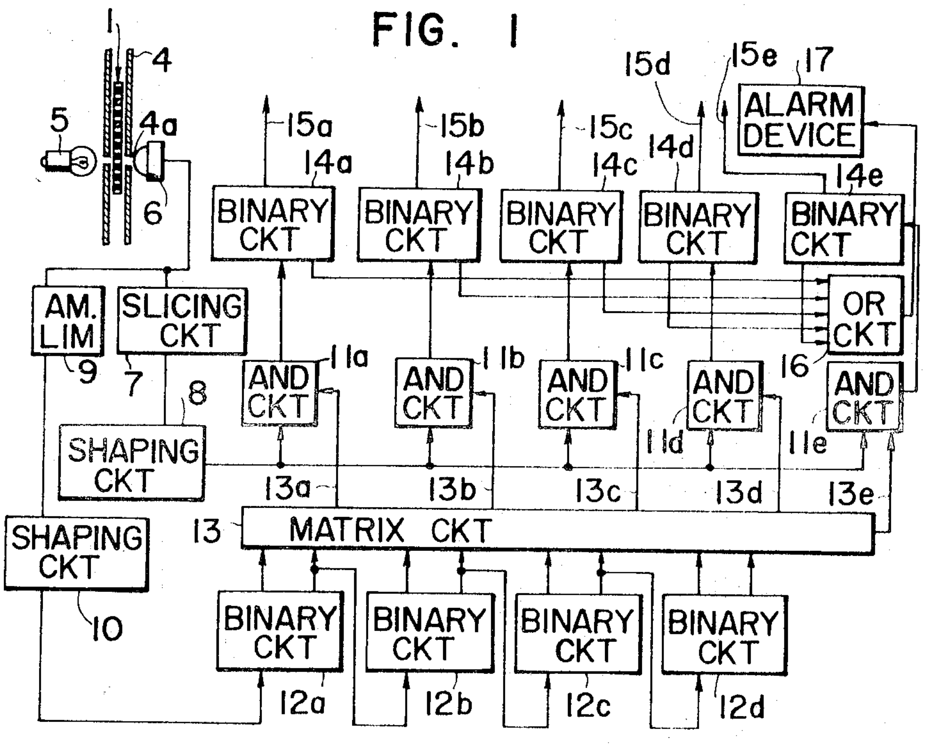
FIG. 1 is a schematic block circuit diagram illustrating the information readout system of the invention.
Figure 2:
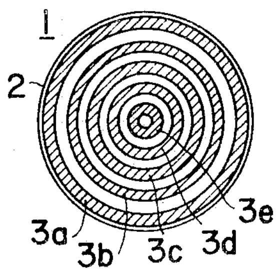
FIG. 2 is a plan view of an information carrier.

Referring first to FIG. 2, an information carrier 1 comprises a circular disc-shape transparent base 2 carrying transparent annular information indicia **3*a*, 3*c* and 3*d*, and nontransparent annular indicia 3*b* and 3*e***. The physical properties of the information indicia are determined in accordance with the particular application, and it will be noted that the same kind of information indicia passes a detector twice during each readout operation.

To perform a readout operation, the information carrier 1 is passed through a chute 4, constituting a detection path, having aligned small diameter apertures **4*a* in each of a pair of opposite side walls. A light source 5 is disposed on the outside of one wall in alignment with the aperture 4*a* therein, and a phototransistor 6 is provided on the exterior of the other wall in alignment with the aperture 4*a*** therein.

First and second pulse train generating means are connected to the output of phototransistor 6. The first pulse train generating means comprises a slicing circuit 7 connected to the output of phototransistor 6 and a shaping circuit 8 connected to the output of slicing circuit 7. This first pulse train generating means operates to derive specific outputs detected by phototransistor 6 and corresponding to only those detected information indicia having a specific physical property, such as transparency. The specific outputs are detected by the slicing circuit 7 and the resulting first output pulses are shaped by the shaping circuit 8, the two components 7 and 8 thus cooperating to define the specific outputs.

The second pulse train generating means comprises an amplitude limiter 9, also connected to the output of phototransistor 6, and a shaping circuit 10 connected to the output of amplitude limiter 9. This second pulse train generating means operates to shape all of the outputs detected by phototransistor to a certain specific wave form and thus to provide output clock pulses each corresponding to a detected output of phototransistor 6 and irrespective of the specific physical properties of the detected information indicia.

The output of shaping circuit 8 of the first pulse train generating means is connected in parallel to one input of each of a number of AND-circuits **11*a*, 11*b*,....11*e* each corresponding to an information indicia 3*a*...3*e*. First inputs of the AND circuits are thus connected in parallel to the output of shaping circuit 8. For ready reference the circuits 11*a*...11*e*** will be hereinafter referred to, as a whole, as the "AND circuit." circuit.

The output of shaping circuit 10 of the second pulse train generating means is connected to a binary circuit 12. This binary circuit comprises binary circuits **12*a*, 12*b*, 12*c* and 12*d* corresponding to information indicia 3*a*...3*e*. These binary circuits operate to convert digitally the output of the second pulse train generating means into a binary signal. It will be noted that the output of binary circuit 12*a* is connected to binary circuit 12*b*, and the binary circuits are connected, one after another, in cascade to binary circuit 12*d***.

The outputs of binary circuits **12*a*...12*d* are connected to the inputs of matrix circuit 13. The outputs of matrix circuit 13 are connected to the second inputs of respective AND-circuits 11*a*...11*e*, through the medium of lines 13*a*,13*b*... lines carry outputs corresponding to the respective information indicia 3*a*...3*e*. The AND-circuits 11*a*...11*b* thus have applied thereto the outputs of the first pulse train generating means as well as the outputs of the second pulse generating means, the latter being applied through the medium of lines 13*a*...13*e* connected to the outputs of matrix circuit 13. Thus, the AND circuit is controlled by the output of shaping circuit 8 and the outputs of matrix 13**.

The outputs of AND-circuits **11*a*...11*e* are connected to the inputs of respective flip-flop circuits 14*a*, 14*b*...14*e* each corresponding to a respective information indicia 3*a*...3*e* and arranged as a binary circuit. Flip-flop circuits 14*a*...14*e* are supplied with control output signals when the outputs of shaping circuit 8 and matrix 13 are supplied simultaneously or concurrently to the inputs of AND-circuits 11*a*...11*e*. Signal transmission lines 15*a*, 15*b*...15*e* are connected to the respective flip-flop circuits 14*a*...14*e***.

The outputs of flip-flop circuits 14*a*...14*e* are also supplied as inputs to an OR-circuit 16, whose output is connected to an alarm device 17.

When information carrier or plate 1 is inserted into chute 4, phototransistor 6 senses the variation in the light received from light source 5 as carrier 1 moves past the apertures 4*a*. This variation is caused by the difference in the physical properties, such as transparency, of the information indicia 3*a*...3*e*.

Figure 3:
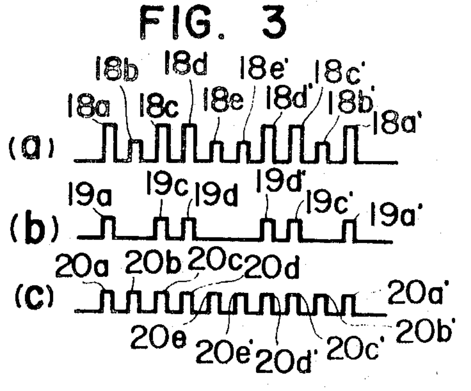
FIG. 3*a* illustrates the output pulses.
FIG. 3*b* illustrates the first pulses derived by the first means from the output pulses.
FIG. 3*c* illustrates the clock pulses derived by the second means responsive to each detected output.

There thus appears, at the output of phototransistor 6, as shown in FIG. 3*a*, relatively large amplitude outputs 18*a*, 18*c* and 18*d* corresponding to information indicia 3*a*, 3*c* and 3*d* of transparent material, and relatively small amplitude read outputs 18*b* and 18*e* corresponding to information indicia 3*b* and 3*e* of nontransparent material. Because information indicia 3*b* and 3*e* are arranged as concentric annular indicia forming a point symmetry, read outputs 18'*e*...18'*a* appear symmetrically with respect to read outputs 18*a*...18*e* as information carrier 1 moves past apertures 4*a*. These read outputs are applied to the inputs of the first and second pulse train generating means.

In the first pulse train generating means, read outputs 18*a*, 18*c*, 18*d*, 18'*d*, 18'*c* and 18'*a*, of large amplitude are derived by slicing circuit 7 and shaped by shaping circuit 8. This produces a pulse train 19 comprising read outputs 19*a*, 19*c*, 19*d*, 19'*d*, 19'*c* and 19'*a*, as shown in FIG. 3*b*. The pulse outputs 19 are supplied to AND-circuits 11*a*...11*e*.

In the second pulse train generating means, the amplitudes of all the read outputs 18*a*...18*e* and 18'*e*...18'*a* are made uniform by amplitude limiter 9 and shaped by shaping circuit 10. This produces output clock pulses 20*a*...20*e* and 20'*e*...20'*a* as shown in FIG. 3*c*. These output pulses are supplied to binary circuit 12*a*.

Binary circuit 12*a* converts digitally its corresponding input into a binary signal. In the same manner the output pulses 20*a*...20*e* and 20'*e*...20'*a* are converted digitally by the binary circuits 12*a* through 12*d* into respective binary signals. The outputs of binary circuits 12*a* through 12*d* are supplied to matrix circuit 13.

In matrix circuit 13, an output is produced in line 13*a* when, for example, the output 20*a* or 20'*a* is supplied thereto as previously described. Accordingly, matrix output signals are produced in lines 13*a*...13*e* when outputs 20*a*...20*e* and 20'*e*...20'*a* of the binary circuit corresponding to the lines 13*a*...13*e* respectively are supplied to the matrix circuit 13. The outputs signals in lines 13*a*...13*e* are supplied to the respective AND-circuits 11*a*...11*e* to control these AND circuits.

As previously mentioned, AND-circuits 11*a*—11*e* receive the pulses 19 of FIG. 3*b* derived by the first pulse train generating means. By reference to FIGS. 3*b* and 3*c*, it will be noted that when a signal 20*a* is produced in line 13*a* of matrix circuit 13, as a result of operation of the second pulse generating means, the signal 19*a* is concurrently supplied to all the AND-circuits 11*a*...11*e*. In this case, accordingly only AND-circuit 11*a* is operated to supply an output to flip-flop circuit 14*a*. similarly, when signals 20*c* and 20*d* are produced in lines 13*c* and 13*d*, respectively of matrix circuit 13, signals 19*c* and 19*d* are supplied to the AND-circuits 11*a*...11*e*. Thus, only AND-circuits 11*c* and 11*d* are operated.

Since information indicia 3*a*...3*e* appear symmetrically with respect to the center of information plate 1, specific ones of AND-circuits 11*e*...11*a* are sequentially operated by outputs 19'*e*...19b*:a*, from the first pulse train generating means, and by the outputs 20'*e*...20'*a*, in the same manner as described above but in the reverse direction. In other words, AND-circuits 11*a*, 11*c* and 11*d* deliver their outputs twice.

On the contrary, when signals 20*b* and 20*e* of the second pulse train generating means are produced, respectively, in lines 13*b* and 13*e* of matrix circuit 13, there is no signal 19 from the first pulse train generating means, corresponding to the signals 20*b* and 20*e*. Consequently, AND-circuits 11*b* and 11*e* do not deliver any output.

From the foregoing, it will be clear that flip-flop circuits 14*a*, 14 *c* and 14*d* are supplied twice with the output from the respective AND-circuits 11*a*, 11*c* and 11*d*. Flip-flop circuits 14*a*...14*e* are initially in the reset state, and are turned into the set state upon receipt of the first output from the respective AND-circuit 11*a*...11*e*. The flip-flop circuits are restored to the reset state upon receipt of the second output from a respective AND-circuit 11*a*...11*e*. Flip-flop circuits 14*a*...14*e*, responsive to receipt of two signals, deliver certain specific shift signals which are transmitted over signal lines 15*a*...15*e* respectively.

In the illustrative example, flip-flop circuits 14*b* and 14*e* do not generate any shift signal, since they have no input supplied thereto from the respective AND-circuits 11*b* and 11*e*. The signals in lines 15*a*...15*e* are read, as a whole, as an information.

If, for any reason, only a single output signal from an AND-circuit 11*a*...11*d* is supplied to the respective associated flip-flop circuit 14*a*...14*e*, the associated flip-flop circuit will appear in the nonreset state. Responsive thereto, OR-circuit 16 produces an output signal to actuate alarm device 17. Thereby, an erroneous signal is detected and misreading can be prevented.

From the foregoing description, it will be clear that the apparatus of the invention includes an information plate or carrier constituted in such a manner that a plurality of information indicia, whose physical properties differ from those of the base, are so disposed on the base that the same kind of information indicia appears twice during a readout operation. The apparatus includes a detector for detecting the physical properties of the information indicia, a first pulse train generating means providing output signals corresponding to specific outputs detected by the detector, and a second pulse train generating means providing outputs responsive to all of the outputs detected by the detector. A plurality of AND circuits are provided in correspondence with the respective information indicia, and have applied thereto, directly, the outputs of the first pulse train generating means. A matrix circuit has applied thereto the outputs from the second pulse train generating means, and supplies control outputs to the AND circuits corresponding to the information indicia and in accordance with the outputs of the information indicia. Flip-flop circuits are connected to the outputs of the AND circuits in correspondence with respective AND circuits.

In accordance with the invention, the physical properties of the information indicia formed, for example, in a point symmetry are detected so that the same kind of information indicia appears twice on the information carrier during a readout operation. Only specific ones of the detected outputs are supplied to the AND circuit and, at the same time, all of the detected outputs as applied to the AND circuits corresponding to the information ion indicia, through output leads of the matrix circuit each corresponding to an information indicia. When the two outputs appear at an AND circuit concurrently or simultaneously the AND circuit is operated and its output is supplied to a corresponding respective flip-flop circuit. As the information indicia are so arranged that the same kind of information indicia appears twice on the information carrier during a readout operation, each AND circuit which receives simultaneously two inputs provides two outputs during movement of the information carrier past the detector. The outputs are supplied to the corresponding flip-flop circuit, thus enabling the flip-flop circuit to perform a specific operation. For example, an information recognition operation. In summary, the invention utilizes the characteristics of the binary circuit and provides a novel and efficient readout system in which an output for operation of a binary circuit is obtained effectively, whereby a specific information can be positively delivered.

What is claimed is:

1. An information readout system comprising, in combination, an information carrier comprising a base and information indicia carried by the base in spaced relation thereon and having physical properties differing from those of the base, certain of said information indicia having a first specific physical property differing from a second physical property of others of said information indicia; means forming a relatively elongated detection path for travel of said information carrier therealong; a detector, sensitive to the physical properties of all the information indicia, positioned on said path and operable to provide electrical output signals corresponding to all the detected information indicia scanned by said detector as said information carrier moves along said path past said detector; the information indicia being arranged on the base in a manner such that, as said carrier passes along said path past said detector, information indicia passes said detector twice during a readout operation to produce two output signals; first pulse train generating means connected to the output of said detector and, responsive to output signals of said detector during each readout operation, generating an output pulse train including only first output pulses corresponding to those detected information indicia having said first specific physical property, each first pulse appearing twice in said output pulse train; second pulse train generating means connected to the output of said detector and, responsive to output signals of said detector during each readout operation, generating an output pulse train comprising clock pulses to each of the detected information indicia; pulse responsive means equal in number to said information indicia and each respective to a different information indicia, connnected to the outputs of both said pulse train generating means and each operable, responsive to concurrence to a first pulse and clock pulse at its input, to provide a control output signal; and shift signal means each connected to the output of a respective different pulse responsive means and each operable responsive to receipt, during each readout operation, of two control output pulses at its input to provide a shift signal at its output.

2. An information readout system as claimed in claim 1, in which said pulse responsive means comprise AND circuits.

3. An information readout system as claimed in claim 2 in which said shift signal means comprise first binary circuits each having an input connected to the output of a respective AND circuit.

4. An information readout system as claimed in claim 3 including a matrix circuit having outputs each connected to a respective AND circuit; and a plurality of second binary circuits connected in cascade to said second pulse train generating means, and having outputs connected to the inputs of said matrix circuit 5. An information readout system as claimed in claim 4 in which each first binary circuit is a flip-flop circuit normally in the reset state. each flip-flop circuit being changed to the set state responsive to receipt of an initial control output pulse and being restored to the reset state responsive to receipt of the second output pulse.

6. An information readout system as claimed in claim 5, including an OR circuit having its input connected to each of flip-flop circuits and operable, responsive to receipt of only one control output pulse by a connected flip-flop circuit, to provide an output signal, and an alarm connected to the output of said OR circuit.

17. An information readout system, as claimed in claim 11, in which the first pulses train generating means comprises a slicing circuit and a shaping circuit connected in series to the output of said detector; said second pulse train generating means comprising an amplitude limiter and a shaping circuit connected in series to the output of said detector.

8. An information readout system as claimed in claim 11, in which said information carrier comprises a circular base and annular indicia arranged concentrically on said circular base.

9. An information readout system, as claimed in claim 8, in which said circular base is transparent; certain of said information indicia being transparent and others of said information indicia being nontransparent; said detector comprising photoresponsive means operable to scan information carriers.

* * * * *